United States Patent
Asai

(10) Patent No.: US 12,177,935 B2
(45) Date of Patent: Dec. 24, 2024

(54) CONTROL APPARATUS, CONTROL SYSTEM, VEHICLE, AND CONTROL METHOD

(71) Applicant: TOYOTA JIDOSHA KABUSHIKI KAISHA, Toyota (JP)

(72) Inventor: Kentaro Asai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 569 days.

(21) Appl. No.: 17/523,618

(22) Filed: Nov. 10, 2021

(65) Prior Publication Data
US 2022/0150688 A1  May 12, 2022

(30) Foreign Application Priority Data

Nov. 10, 2020 (JP) .................................. 2020-187534

(51) Int. Cl.
*H04W 8/22* (2009.01)
*B60W 40/08* (2012.01)
*B60W 50/14* (2020.01)
*B60W 60/00* (2020.01)

(52) U.S. Cl.
CPC .............. *H04W 8/22* (2013.01); *B60W 40/08* (2013.01); *B60W 50/14* (2013.01); *B60W 60/001* (2020.02); *B60W 2050/146* (2013.01)

(58) Field of Classification Search
CPC ........................................................ H04W 8/22
USPC ........................................................ 455/418
See application file for complete search history.

(56) References Cited

U.S. PATENT DOCUMENTS

2018/0014182 A1* 1/2018 Jaegal ................... H04L 67/12
2018/0173226 A1* 6/2018 Ochida ................. B60W 50/14
2018/0345980 A1  12/2018 Morita et al.

FOREIGN PATENT DOCUMENTS

| JP | 2014-106573 A | 6/2014 |
| JP | 2017-117489 A | 6/2017 |
| JP | 2017-222302 A | 12/2017 |
| JP | 2020-102252 A | 7/2020 |
| WO | 2014/080570 A1 | 5/2014 |

* cited by examiner

*Primary Examiner* — Qutbuddin Ghulamali
(74) *Attorney, Agent, or Firm* — Oliff PLC

(57) ABSTRACT

A control apparatus includes a controller configured to: determine whether a terminal apparatus is present in a vehicle with reference to first positional data that indicates a position of the vehicle and second positional data that indicates a position of the terminal apparatus; and in a case in which the terminal apparatus is determined as being present in the vehicle, determine, according to a driving state of the vehicle, whether to prohibit a first operation to be performed on the terminal apparatus.

18 Claims, 3 Drawing Sheets

CONTROL APPARATUS, CONTROL SYSTEM, VEHICLE, AND CONTROL METHOD

CROSS-REFERENCE TO RELATED APPLICATION

This application claims priority to Japanese Patent Application No. 2020-187534, filed on Nov. 10, 2020, the entire contents of which are incorporated herein by reference.

TECHNICAL FIELD

The present disclosure relates to a control apparatus, a control system, a vehicle, and a control method.

BACKGROUND

Patent Literature (PTL) 1 discloses a driver monitoring system that monitors a state of a driver of a vehicle based on an image captured by an imaging apparatus.

CITATION LIST

Patent Literature

PTL 1: JP 2020-102252 A

SUMMARY

In general, determination by image analysis is easily affected by shooting environment and other factors, which makes it difficult to perform accurate determination. Therefore, the technology described in PTL 1 may not be able to accurately determine a state of a driver who intends to operate a terminal apparatus.

It would be helpful to facilitate preventing a driver from performing an operation on a terminal apparatus.

A control apparatus according to the present disclosure includes a controller configured to:
  determine whether a terminal apparatus is present in a vehicle with reference to first positional data that indicates a position of the vehicle and second positional data that indicates a position of the terminal apparatus; and
  in a case in which the terminal apparatus is determined as being present in the vehicle, determine, according to a driving state of the vehicle, whether to prohibit a first operation to be performed on the terminal apparatus.

A control method according to the present disclosure includes:
  determining, by a control apparatus, whether a terminal apparatus is present in a vehicle with reference to first positional data that indicates a position of the vehicle and second positional data that indicates a position of the terminal apparatus; and
  in a case in which the terminal apparatus is determined as being present in the vehicle, determining, by the control apparatus, whether to prohibit a first operation to be performed on the terminal apparatus according to a driving state of the vehicle.

According to the present disclosure, it is possible to facilitate preventing a driver from performing an operation on a terminal apparatus.

BRIEF DESCRIPTION OF THE DRAWINGS

In the accompanying drawings.

DETAILED DESCRIPTION

Figure 1:
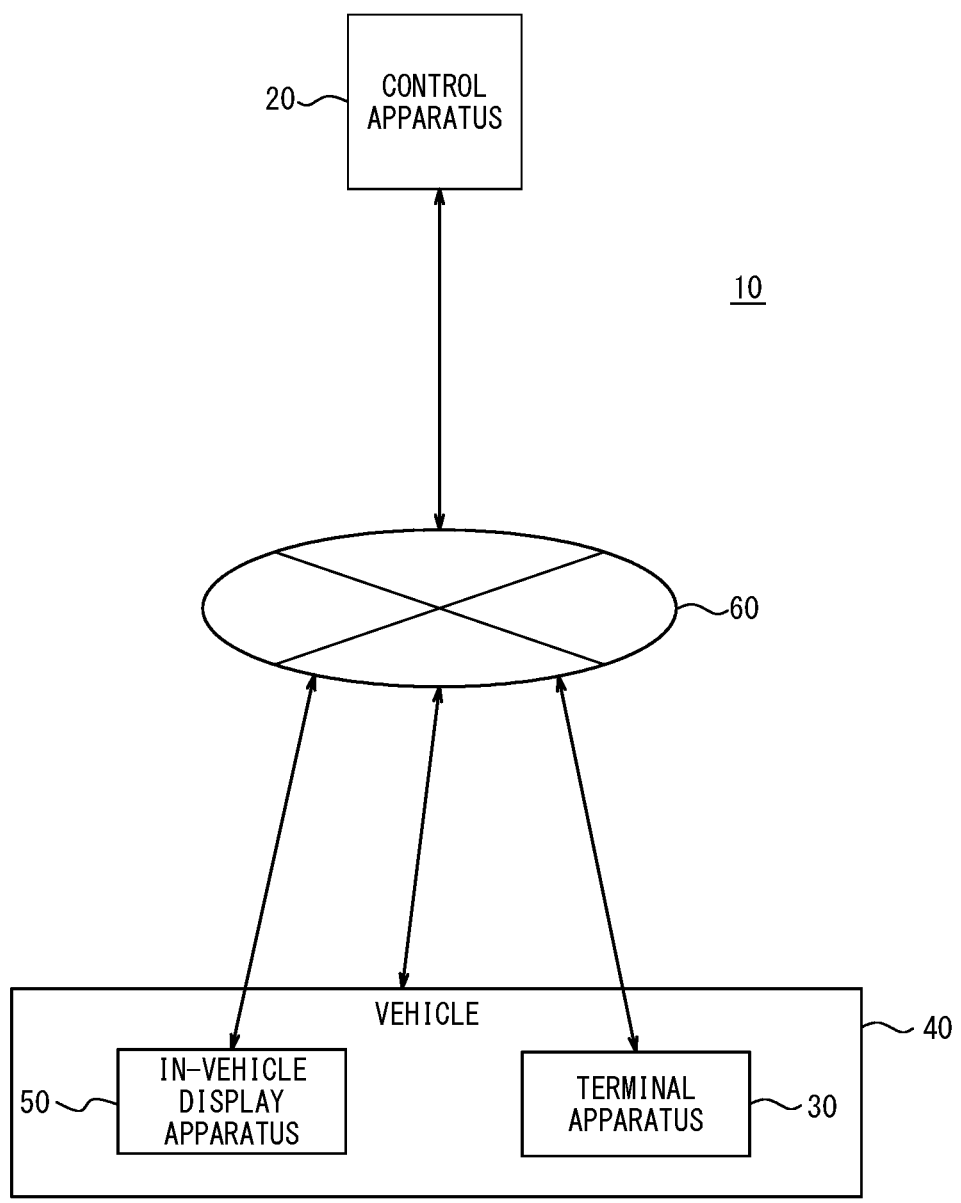
FIG. 1 is a schematic diagram illustrating a configuration of a control system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

With reference to FIG. 1, a configuration of a control system 10 according to the present embodiment will be described.

The control system 10 includes a control apparatus 20, at least one terminal apparatus 30, and an in-vehicle display apparatus 50.

The control apparatus 20 is able to communicate with the terminal apparatus 30 and the in-vehicle display apparatus 50 via a network 60. The control apparatus 20 may be able to communicate with a vehicle 40 via the network 60.

The control apparatus 20 is installed in a facility such as a data center. The control apparatus 20 is a server computer that belongs to a cloud computing system or another type of computing system.

The terminal apparatus 30 is in the possession of a user, and used by the user. The terminal apparatus 30 is, for example, a mobile device such as a mobile phone, a smartphone, or a tablet, or a PC. The term "PC" is an abbreviation of personal computer.

The vehicle 40 is, for example, any type of automobile such as a gasoline vehicle, a diesel vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. In the present embodiment, the vehicle 40 is driven by a driver or the driving is automated at any level. The automation level is, for example, any one of Level 1 to Level 5 according to the level classification defined by SAE. The name "SAE" is an abbreviation of Society of Automotive Engineers. The vehicle 40 may be a MaaS-dedicated vehicle. The term "MaaS" is an abbreviation of Mobility as a Service.

The network 60 includes the Internet, at least one WAN, at least one MAN, or a combination thereof. The term "WAN" is an abbreviation of wide area network. The term "MAN" is an abbreviation of metropolitan area network. The network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The in-vehicle display apparatus 50 is, for example, a display audio. The in-vehicle display apparatus 50 is mounted in the vehicle 40. The in-vehicle display apparatus 50 may have a voice input function. The in-vehicle display apparatus 50 is connectable to the terminal apparatus 30.

In the present embodiment, the in-vehicle display apparatus 50 is configured such that, in a case in which the terminal apparatus 30 is connected to the in-vehicle display apparatus 50, a second operation to be performed on the in-vehicle display apparatus 50 is substituted for at least a part of a first operation to be performed on the terminal apparatus 30. The first operation includes an input operation to be performed via an interface such as a physical key, a capacitive key, a pointing device, a touch screen integrated with a display, or a microphone provided in the terminal apparatus 30. A voice input operation to be performed via a microphone may be excluded from the first operation. Examples of the first operation include setting a destination on a map, selecting a song from among music stored in the terminal apparatus 30, making a phone call, and entering a message. The second operation includes an input operation to be performed via an interface such as a physical key, a capacitive key, a pointing device, a touch screen integrated with a display, or a microphone provided in the in-vehicle display apparatus 50. In a case in which the terminal apparatus 30 is connected to the in-vehicle display apparatus 50, a user of the terminal apparatus 30 can operate the terminal apparatus 30 by performing an operation of setting a destination, selecting a song, making a phone call, or entering a message as the second operation on the in-vehicle display apparatus 50, in the same manner as in a case of performing the first operation on the terminal apparatus 30, without performing the first operation on the terminal apparatus 30. The second operation may not be substituted for every kind of the first operation. For example, the second operation may not be substituted for an operation of using a web browser even if the operation of using a web browser is included in the first operation.

The in-vehicle display apparatus 50 may be incorporated into a car navigation system.

With reference to FIG. 1, an outline of the present embodiment will be described.

The control apparatus 20 determines whether the terminal apparatus 30 is present in the vehicle 40 with reference to first positional data that indicates a position of the vehicle 40 and second positional data that indicates a position of the terminal apparatus 30. In a case in which the terminal apparatus 30 is determined as being present in the vehicle 40, the control apparatus 20 determines, according to a driving state of the vehicle 40, whether to prohibit the first operation to be performed on the terminal apparatus 30.

According to the present embodiment, it is possible to facilitate preventing a driver from performing an operation on the terminal apparatus 30. As a result, safety is improved.

Figure 2:
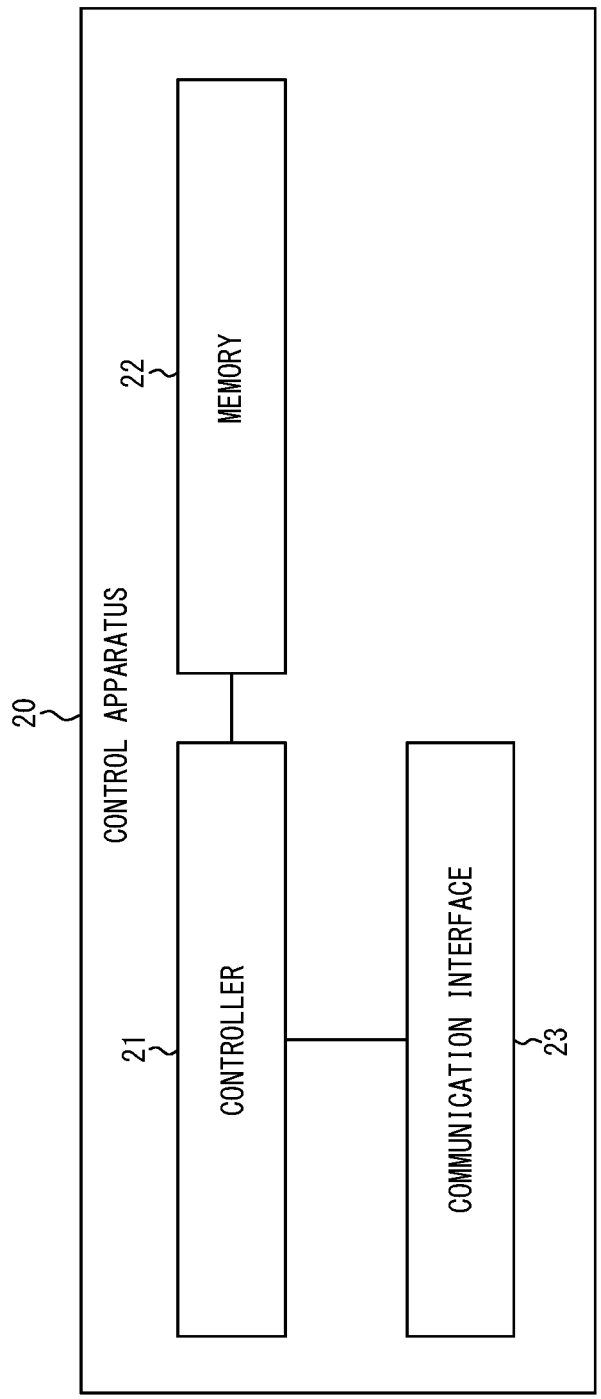
FIG. 2 is a block diagram illustrating a configuration of a control apparatus according to the embodiment of the present disclosure.

With reference to FIG. 2, a configuration of the control apparatus 20 according to the present embodiment will be described.

The control apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The communication interface 23 receives data to be used for the operations of the control apparatus 20, and transmits data obtained by the operations of the control apparatus 20.

The functions of the control apparatus 20 are realized by execution of a program according to the present embodiment by a processor serving as the controller 21. That is, the functions of the control apparatus 20 are realized by software. The program causes a computer to execute the operations of the control apparatus 20, thereby causing the computer to function as the control apparatus 20. That is, the computer executes the operations of the control apparatus 20 in accordance with the program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a programmable circuit or a dedicated circuit serving as the controller 21. That is, some or all of the functions of the control apparatus 20 may be realized by hardware.

Figure 3:
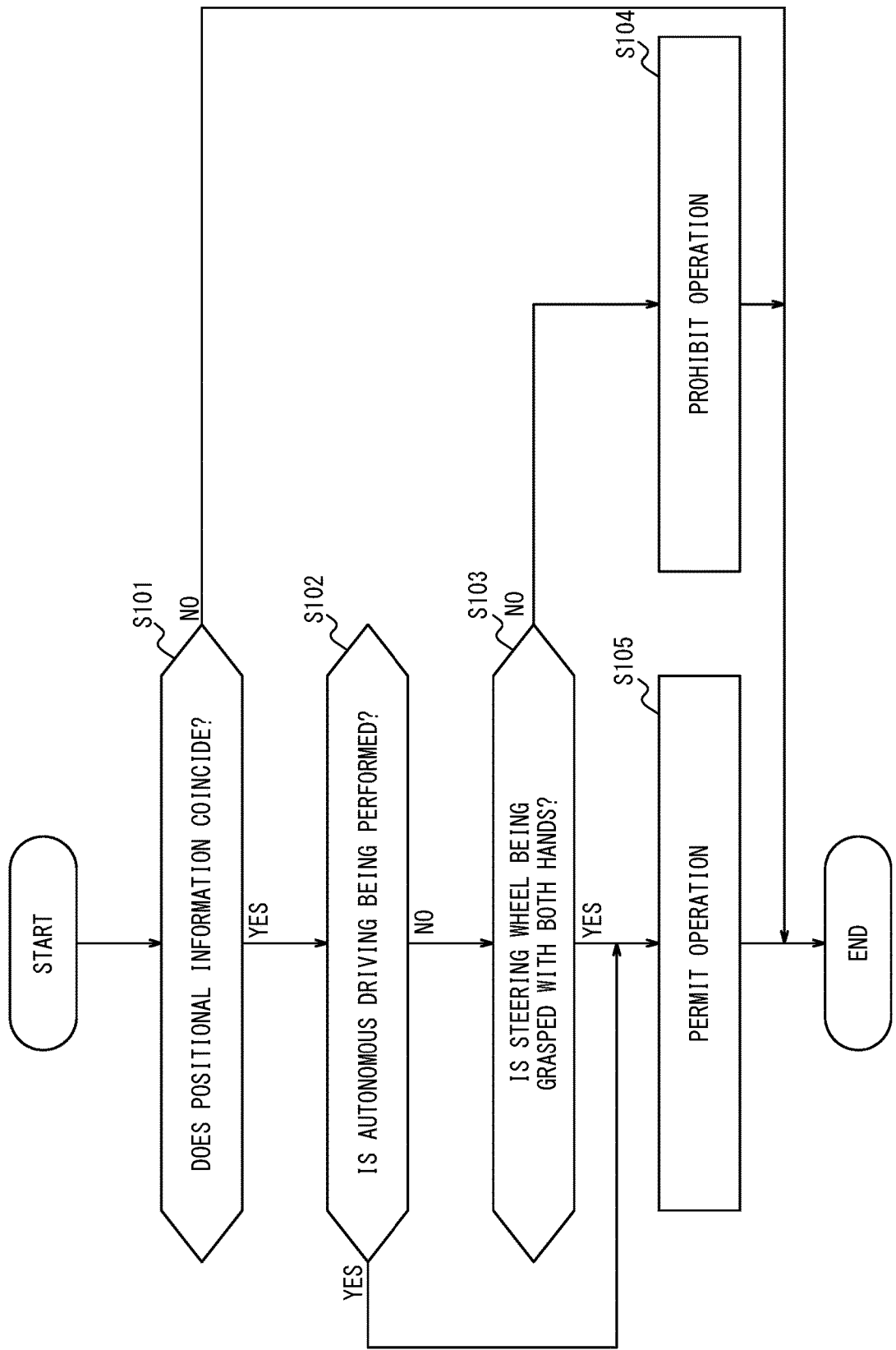
FIG. 3 is a flowchart illustrating operations of the control apparatus according to the embodiment of the present disclosure.

With reference to FIG. 3, operations of the control system 10 according to the present embodiment will be described. These operations correspond to a control method according to the present embodiment.

In step S101, the controller 21 of the control apparatus 20 determines whether the terminal apparatus 30 is present in the vehicle 40 with reference to first positional data that indicates a position of the vehicle 40 and second positional data that indicates a position of the terminal apparatus 30. The first positional data may be acquired by any method. As one example, the controller 21 receives, from the vehicle 40 via the communication interface 23, data that indicates a position measured by a positioning sensor provided in the vehicle 40. The positioning sensor includes at least one GNSS receiver. GNSS is, for example, GPS, QZSS, BeiDou, GLONASS, or Galileo. The term "GNSS" is an abbreviation of global navigation satellite system. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The second positional data may be acquired by any method. As one example, the controller 21 receives, from the terminal apparatus 30 via the communication interface 23, data that indicates a position measured by a positioning sensor provided in the terminal apparatus 30. The positioning sensor includes at least one GNSS receiver. GNSS is, for example, GPS, QZSS, BeiDou, GLONASS, or Galileo.

In the present embodiment, in a case in which first coordinates indicated by the first positional data and second coordinates indicated by the second positional data approximately coincide, the controller 21 of the control apparatus 20 determines that the terminal apparatus 30 is present in the vehicle 40. Specifically, in a case in which the difference between the first coordinates and the second coordinates is less than the total length of the vehicle 40, the controller 21 determines that the terminal apparatus 30 is present in the vehicle 40.

As a variation of the present embodiment, the controller 21 of the control apparatus 20 may refer to, as the second positional data, data that indicates the positions of the plurality of terminal apparatuses, and may determine whether each of a plurality of terminal apparatuses, as the terminal apparatus 30, is present in the vehicle 40.

In a case in which the terminal apparatus 30 is determined as being present in the vehicle 40 in step S101, the controller 21 performs the process of step S102. In a case in which the terminal apparatus 30 is not determined as being present in the vehicle 40, the controller 21 terminates the process.

In step S102, the controller 21 of the control apparatus 20 determines, as a driving state of the vehicle 40, whether the vehicle 40 is performing autonomous driving. In the present embodiment, "autonomous driving" means that all operations related to driving of the vehicle 40 are performed automatically. For example, Level 3 or higher in the level classification defined by SAE corresponds to autonomous driving. The determination of whether the vehicle 40 is performing autonomous driving may be made by any method. As one method, the controller 21 determines whether any driver assistance function is operating in the vehicle 40. An example of the driver assistance function is the ADAS function. The term "ADAS" is an abbreviation of advanced driver-assistance systems. In a case in which the vehicle 40 is determined as not performing autonomous driving in step S102, the process of step S103 is performed. In a case in which the vehicle 40 is determined as performing autonomous driving in step S102, the process of step S105 is performed. The process of step S105 will be described later.

In step S103, the controller 21 of the control apparatus 20 further determines, as the driving state of the vehicle 40, whether a steering wheel of the vehicle 40 is being grasped with both hands. The determination of whether the steering wheel is being grasped with both hands may be made by any method. As one example, the controller 21 makes the determination based on a sensor value measured by a contact sensor, a pressure sensor, or both attached to the steering wheel in advance. Specifically, the controller 21 determines that the steering wheel is being grasped with both hands, in a case in which the sensor value indicates that the steering wheel is contacted and pressurized at two or more points. In a case in which the steering wheel is not determined as being grasped with both hands in step S103, the process of step S104 is performed. In a case in which the steering wheel is determined as being grasped with both hands in step S103, the process of step S105 is performed. The process of step S105 will be described later.

In step S104, the controller 21 of the control apparatus 20 determines to prohibit the first operation. As a variation of the present embodiment, in a case in which a plurality of terminal apparatuses is determined as being present as the terminal apparatuses 30 in the vehicle 40 in step S101, the controller 21 prohibits, as the first operation, an operation to be performed on every terminal apparatus of the plurality of terminal apparatuses. The first operation, which may be prohibited by any procedure, is prohibited by the following procedure in the present embodiment.

The controller 21 of the control apparatus 20 controls the communication interface 23 to transmit notification data notifying that the first operation on the terminal apparatus 30 is prohibited. The communication interface 23 transmits the notification data to the terminal apparatus 30.

The terminal apparatus 30 receives the transmitted notification data from the control apparatus 20 via an interface compliant with a mobile communication standard such as LTE, the 4G standard, or the 5G standard. Upon receiving the notification data, the terminal apparatus 30 darkens the display, such as an LCD or an organic EL display. The term "LCD" is an abbreviation of liquid crystal display. The term "EL" is an abbreviation of electro luminescence. In the present embodiment, to darken the display of the terminal apparatus 30 means to turn off a backlight of the display so that icons or the like to be selected by a user in operating the terminal apparatus 30 are not displayed on the screen. In a case in which icons or the like are not displayed on the screen, the user can no longer select the icons or the like to activate a desired function of the terminal apparatus 30. In other words, the user cannot perform an operation to select any icon on the terminal apparatus 30 via an interface such as a physical key, a capacitive key, a pointing device, and a touch screen integrated with the display. Therefore, the first operation on the terminal apparatus 30 is prohibited.

In step S105, the controller 21 of the control apparatus 20 determines not to prohibit the first operation. In a case in which it is determined not to prohibit the first operation, the controller 21 terminates the process.

As described above, according to the present embodiment, the controller 21 of the control apparatus 20 determines, according to a driving state of the vehicle 40, whether to prohibit the first operation to be performed on the terminal apparatus 30. For example, the first operation is prohibited in a case in which the steering wheel is not being grasped with both hands. Accordingly, it is possible to reliably prevent a driver from performing an operation on the terminal apparatus 30, thus improving safety. Safety is expected to be improved in that the driver is motivated to drive with both hands. The first operation is not prohibited in a case in which the vehicle 40 is performing autonomous driving, and thus, safety is expected to be improved in that the driver is motivated to turn to autonomous driving in the case of needing to use the terminal apparatus 30.

As a variation of the present embodiment, in a case in which a plurality of terminal apparatuses is brought into the vehicle 40, the first operation is uniformly prohibited according to a driving state of the vehicle 40, without determining which terminal apparatus belongs to the driver. Thus, the operation of the terminal apparatus 30 by the driver is more reliably prohibited.

In a case in which the terminal apparatus 30 is connected to the in-vehicle display apparatus 50, the controller 21 of the control apparatus 20 determines not to prohibit the second operation, regardless of whether the first operation is prohibited. For example, suppose that a plurality of terminal apparatuses is determined as being present in the vehicle 40 in step S101, and one of the plurality of terminal apparatuses is connected to the in-vehicle display apparatus 50. In step S104, the controller 21 darkens the displays of all the plurality of terminal apparatuses, but does not darken the display of the in-vehicle display apparatus 50. Therefore, the user performs, as the second operation, an operation of selecting an icon displayed on the screen of the in-vehicle display apparatus 50, to thereby indirectly operate the terminal apparatus connected to the in-vehicle display apparatus 50. The user may perform an operation through voice, as the second operation on the in-vehicle display apparatus 50. According to this variation, the user can still use the functions of a terminal apparatus even if the user cannot directly operate the terminal apparatus, which improves convenience for the user.

As a variation of the present embodiment, as a method for prohibiting the first operation in step S104, the terminal apparatus 30 may be forced to be dormant, instead of darkening the display of the terminal apparatus 30. However, if the terminal apparatus 30 is forced to be dormant when the terminal apparatus 30 is connected to the in-vehicle display apparatus 50, the second operation cannot be performed; thus, the first operation is prohibited by another method, such as by darkening the display of the terminal apparatus 30. For example, suppose that a plurality of terminal apparatuses is determined as being present in the vehicle 40 in step S101, and one of the plurality of terminal apparatuses is connected to the in-vehicle display apparatus 50. In this case, the controller 21 of the control apparatus 20 may determine to force all the plurality of terminal devices, except for a terminal apparatus connected to the in-vehicle display apparatus 50, to be dormant. In other words, the controller 21 may determine to prohibit the first operation in another way for a terminal apparatus connected to the in-vehicle display apparatus 50.

As a variation of the present embodiment, in a case in which the vehicle 40 does not have an autonomous driving function, the process of step S102 need not be performed. In this variation, in a case in which the terminal apparatus 30 is determined as being present in the vehicle 40 in step S101, the process of step S103 is performed.

The present disclosure is not limited to the embodiment described above. For example, two or more blocks illustrated in the block diagram may be integrated, or a block may be divided. Instead of executing two or more steps illustrated in the flowchart in chronological order in accordance with the description, the steps may be executed in parallel or in a different order according to the processing capability of the apparatus that executes each step, or as required. Other modifications can be made without departing from the spirit of the present disclosure.

The invention claimed is:

1. A control apparatus comprising a controller configured to:
    determine whether a terminal apparatus is present in a vehicle with reference to first positional data that indicates a position of the vehicle and second positional data that indicates a position of the terminal apparatus; and
    when the terminal apparatus is determined as being present in the vehicle, determine, according to a driving state of the vehicle, whether to prohibit a first operation to be performed on the terminal apparatus,
    wherein the controller is configured to:
        refer to, as the second positional data, data that indicates positions of a plurality of terminal apparatuses; and
        when the plurality of terminal apparatuses is determined as being present in the vehicle, determine whether to prohibit, as the first operation, an operation to be performed on every terminal apparatus of the plurality of terminal apparatuses.

2. The control apparatus according to claim 1, wherein the controller is configured to determine, as the driving state, whether a steering wheel of the vehicle is being grasped with both hands.

3. The control apparatus according to claim 2, wherein the controller is configured to determine not to prohibit the first operation, when the steering wheel is determined as being grasped with both hands.

4. The control apparatus according to claim 2, wherein the controller is configured to determine to prohibit the first operation, when the steering wheel is determined as not being grasped with both hands.

5. The control apparatus according to claim 1, wherein the controller is configured to determine, as the driving state, whether the vehicle is performing autonomous driving.

6. The control apparatus according to claim 5, wherein the controller is configured to determine not to prohibit the first operation, when the vehicle is determined as performing autonomous driving.

7. The control apparatus according to claim 5, wherein the controller is configured to determine whether to prohibit the first operation according further to whether a steering wheel of the vehicle is being grasped with both hands, when the vehicle is determined as not performing autonomous driving.

8. The control apparatus according to claim 1, wherein the vehicle has an in-vehicle display apparatus mounted therein, the in-vehicle display apparatus being connectable to the terminal apparatus and configured such that, when the terminal apparatus is connected to the in-vehicle display apparatus, a second operation to be performed on the in-vehicle display apparatus is substituted for at least a part of the first operation, and the controller is configured to determine not to prohibit the second operation regardless of whether to prohibit the first operation.

9. A control system comprising:

the control apparatus according to claim 1; and a terminal apparatus configured to communicate with the control apparatus.

10. A control system; comprising:

the control apparatus according to claim 8;

a terminal apparatus configured to communicate with the control apparatus; and an in-vehicle display apparatus connectable to the terminal apparatus, the in-vehicle display apparatus being configured such that, when the terminal apparatus is connected to the in-vehicle display apparatus, a second operation to be performed on the in-vehicle display apparatus is substituted for at least a part of the first operation.

11. A vehicle comprising the control apparatus according to claim 1.

12. A vehicle comprising:

the control apparatus according to claim 8; and an in-vehicle display apparatus connectable to the terminal apparatus and configured such that, when the terminal apparatus is connected to the in-vehicle display apparatus, a second operation to be performed on the in-vehicle display apparatus is substituted for at least a part of the first operation.

13. A control method comprising:

determining, by a control apparatus, whether a terminal apparatus is present in a vehicle with reference to first positional data that indicates a position of the vehicle and second positional data that indicates a position of the terminal apparatus;

when the terminal apparatus is determined as being present in the vehicle, determining, by the control apparatus, whether to prohibit a first operation to be performed on the terminal apparatus, according to a driving state of the vehicle;

referring, by the control apparatus, to data that indicates positions of a plurality of terminal apparatuses, as the second positional data; and when the plurality of terminal apparatuses is determined as being present in the vehicle, determining, by the control apparatus, whether to prohibit, as the first operation, an operation to be performed on every terminal apparatus of the plurality of terminal apparatuses.

14. The control method according to claim 13, further comprising determining, by the control apparatus, whether a steering wheel of the vehicle is being grasped with both hands, as the driving state.

15. The control method according to claim 13, further comprising determining, by the control apparatus, whether the vehicle is performing autonomous driving, as the driving state.

16. The control method according to claim 15, further comprising determining, by the control apparatus, not to prohibit the first operation, when the vehicle is determined as performing autonomous driving.

17. The control method according to claim 15, further comprising determining, by the control apparatus, whether to prohibit the first operation according further to whether a steering wheel of the vehicle is being grasped with both hands, when the vehicle is determined as not performing autonomous driving.

18. The control method according to claim 13, wherein the vehicle has an in-vehicle display apparatus mounted therein, the in-vehicle display apparatus being connectable to the terminal apparatus and configured such that, when the terminal apparatus is connected to the in-vehicle display apparatus, a second operation to be performed on the in-vehicle display apparatus is substituted for at least a part of the first operation, the control method further comprising determining, by the control apparatus, not to prohibit the second operation regardless of whether to prohibit the first operation.

\* \* \* \* \*